US012670103B2

(12) United States Patent
Martin et al.

(10) Patent No.: US 12,670,103 B2
(45) Date of Patent: Jun. 30, 2026

(54) PAGING METADATA INTO MEMORY

(71) Applicant: Dell Products L.P., Round Rock, TX (US)

(72) Inventors: Owen Martin, Hopedale, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 18/787,516

(22) Filed: Jul. 29, 2024

(65) Prior Publication Data

US 2026/0030168 A1    Jan. 29, 2026

(51) Int. Cl.
*G06F 12/0882*    (2016.01)
*G06F 12/123*    (2016.01)
*G06F 12/126*    (2016.01)

(52) U.S. Cl.
CPC ........ *G06F 12/0882* (2013.01); *G06F 12/123* (2013.01); *G06F 12/126* (2013.01)

(58) Field of Classification Search
CPC ... G06F 12/0882; G06F 12/123; G06F 12/126
See application file for complete search history.

(56) References Cited

U.S. PATENT DOCUMENTS

| | | | |
|---|---|---|---|
| 9,852,076 B1 * | 12/2017 | Garg .................... | G06F 12/0875 |
| 10,152,428 B1 * | 12/2018 | Alshawabkeh ..... | G06F 12/1027 |
| 11,366,765 B1 * | 6/2022 | Xie ...................... | G06F 12/0871 |
| 2008/0162817 A1 * | 7/2008 | Batterywala ........... | G06F 3/067 |
| | | | 711/E12.017 |
| 2017/0192892 A1 * | 7/2017 | Pundir .................. | G06F 3/0644 |
| 2017/0228397 A1 * | 8/2017 | Cantley .................. | G06F 16/93 |
| 2020/0057715 A1 * | 2/2020 | Benisty .............. | G06F 12/0246 |
| 2020/0293447 A1 * | 9/2020 | Gupta ................. | G06F 12/0868 |
| 2024/0330173 A1 * | 10/2024 | Stoica ................. | G06F 12/0246 |

* cited by examiner

*Primary Examiner* — Aracelis Ruiz
(74) *Attorney, Agent, or Firm* — Krishnendu Gupta; Nikhil Patel

(57)    ABSTRACT
One or more aspects of the present disclosure relate to paging metadata into memory. In embodiments, a metadata demand score is calculated for each extent of a storage array based on hit forecasts and read forecasts corresponding to input/output (IO) operations targeting each extent. Further, each extent can be ranked based on their respective metadata demand scores. Additionally, metadata can be paged into memory from a storage device of the storage array based on the ranking to reduce metadata page misses. For example, the memory can correspond to a global memory portion of the storage array.

18 Claims, 7 Drawing Sheets

700

702 calculating a metadata demand score for each extent of a storage array based on hit forecasts and read forecasts corresponding to input/output (IO) operations targeting each extent 704 ranking each extent based on their respective metadata demand scores 706 paging metadata into memory from a storage device of the storage array based on the ranking to reduce metadata page misses

200

311

500

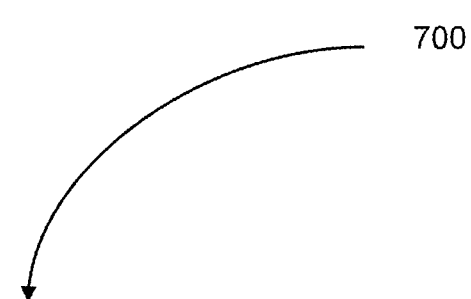

700 calculating a metadata demand score for each extent of a storage array based on hit forecasts and read forecasts corresponding to input/output (IO) operations targeting each extent

702 ranking each extent based on their respective metadata demand scores

704 paging metadata into memory from a storage device of the storage array based on the ranking to reduce metadata page misses

PAGING METADATA INTO MEMORY

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/ withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to paging metadata into memory. In embodiments, a metadata demand score is calculated for each extent of a storage array based on hit forecasts and read forecasts corresponding to input/output (IO) operations targeting each extent. Further, each extent can be ranked based on their respective metadata demand scores. Additionally, metadata can be paged into memory from a storage device of the storage array based on the ranking to reduce metadata page misses. For example, the memory can correspond to a global memory portion of the storage array.

In embodiments, the metadata demand score for each extent can be adjusted based on a service level associated with each extent, with higher service levels resulting in a higher adjustment factor.

In embodiments, Least Recently Used (LRU) cache slots corresponding to paged extent metadata in the memory can be identified. Additionally, Most Recently Used (MRU) cache slots corresponding to the paged extent metadata in the memory can be identified. Further, the metadata can be paged into the memory from the storage device based on the LRU and MRU cache slots.

In embodiments, each extent with a service level below a service level threshold can be excluded from receiving the metadata demand score.

In embodiments, IO access patterns of each extent can be monitored. Further, an activity mask for each extent can be generated based on the monitored IO access patterns. In addition, the metadata demand score for each extent can be dynamically updated using the activity mask for each extent.

In embodiments, a metadata hint for a subject extent can be established based on the metadata demand score of the subject extent and a service level of the extent.

In embodiments, each extent with the metadata hint can be inserted into the memory.

In embodiments, each extent with the metadata hint can be provided with an artificial timestamp to prioritize its retention in the memory based on predicted future access of each extent.

In embodiments, a rate of metadata hinting for each extent can be controlled based on the metadata demand score of each extent to avoid excessive churn in the memory.

In embodiments, extent-level statistics can be received from another storage array. Further, an effective metadata demand score for each extent of the storage array can be generated using the extent level statistics from the other storage and the metadata demand score for each extent of the storage array.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 7 is a flow diagram of a method for paging metadata into memory per embodiments of the present disclosure.

DETAILED DESCRIPTION

Figure 1:
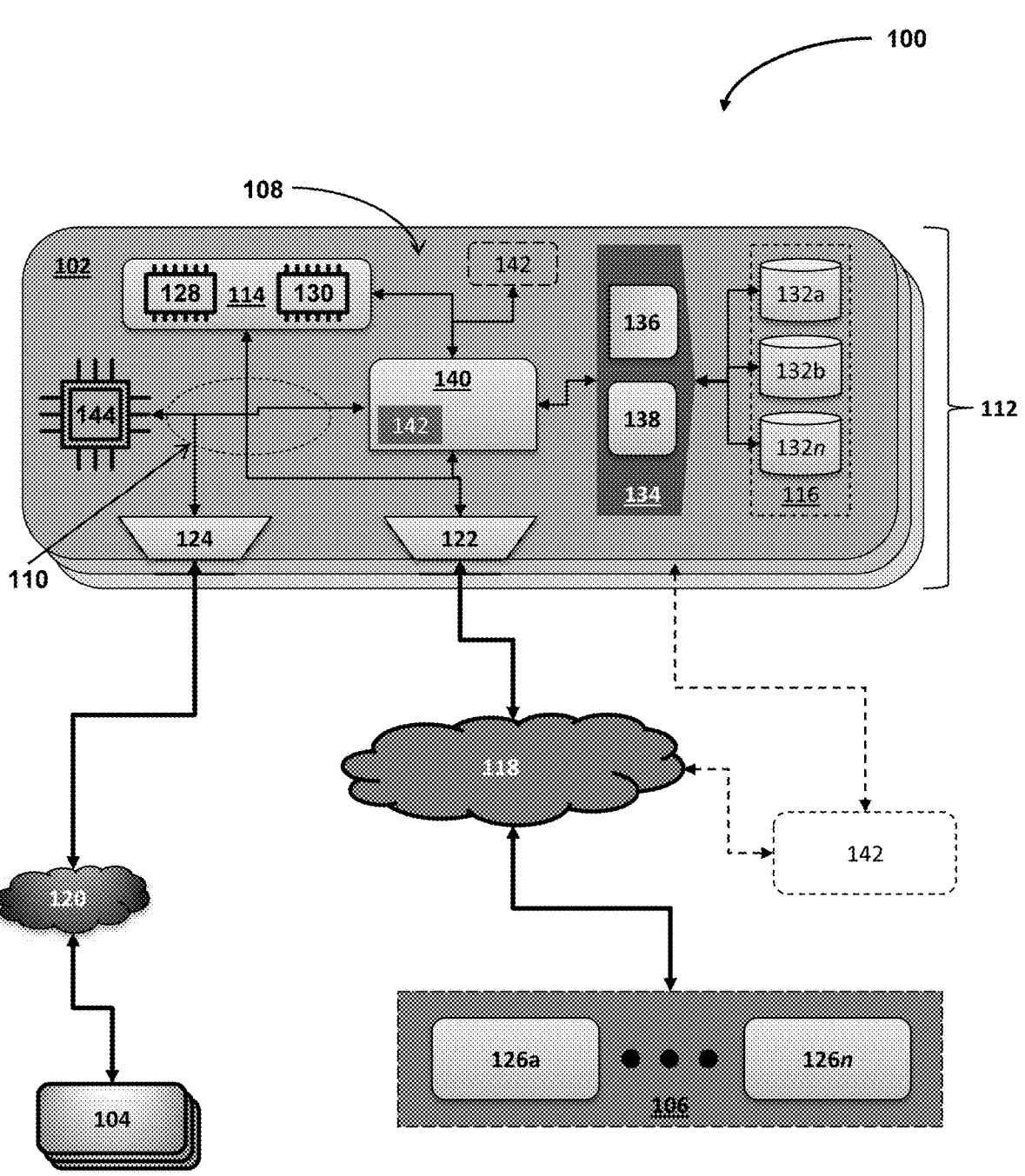
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications. Suppose, for example, a bank has many customers, each with various accounts, transaction histories, and personal details. Accordingly, the bank can use a storage array to securely store and quickly access customer information when needed—for example, when a customer logs into their online banking account to check their balance or when they use an ATM to withdraw cash.

In embodiments, a storage array can use metadata to orchestrate efficient data access and management of data (e.g., customer information). Metadata, data about data, includes crucial information such as file locations, data creation and modification timestamps, and access permissions. For example, metadata is like a library's detailed catalog or index. Just as a library catalog helps you find where a book is located without needing to search every shelf, metadata helps the bank's computer systems quickly locate and manage the data without scanning every piece of information stored in their systems. Further, the storage array can store metadata separately from its corresponding actual data, often in faster storage mediums like flash memory, to facilitate quicker retrieval and management operations.

Thus, metadata management is crucial for accelerating data retrieval processes. By storing metadata separately in a readily accessible format, storage systems can quickly locate the physical positions of files or data blocks without scanning the entire storage volume. This is particularly vital in large-scale storage environments where the sheer volume of data can make unindexed searches impractically slow. For example, when customers use an ATM, the system must quickly retrieve their account balance and verify their PIN. Metadata in the bank's storage arrays helps locate this information swiftly by pointing exactly where the data is stored among the vast amounts of information in the bank's systems.

However, as the volume of data and the speed of data access requirements have increased, traditional metadata management methods have struggled to keep pace. Issues such as metadata page misses, where the required metadata is not present in the cache (e.g., of global memory) and must be fetched from slower storage, can significantly degrade performance. This is particularly problematic in environments with heavy read and write operations, leading to frequent cache misses and increased latency.

The impact of metadata page misses is particularly pronounced during read and write input/output (IO) operations. When metadata is not readily available in memory, each miss can delay data retrieval and writing processes, thereby degrading the overall performance of the storage array. This issue is exacerbated in systems with heavy write loads, where the frequency of metadata updates and accesses increases, leading to a higher likelihood of page misses.

In the context of a Remote Data Facility (RDF), the problem of metadata page misses becomes even more critical due to the nature of data replication and synchronization between primary and secondary storage arrays. RDF is typically used for disaster recovery and data protection by synchronizing data between a primary (R1) and a secondary (R2) storage array.

The challenge arises, for example, when the R2 array, which serves as the backup or replication site, experiences metadata page misses. This issue is compounded in scenarios with write-heavy workloads, where the R2 array must continuously update its metadata to reflect changes made in the R1 array. Each metadata page miss in the R2 array slows the synchronization process and increases the recovery point objective (RPO), potentially leading to longer data recovery times in the event of a primary array failure.

Moreover, the R2 array's performance is crucial when it needs to take over from the R1 array during a failover scenario. If the R2 array is slow due to frequent metadata page misses, it can significantly impact the overall system performance and data availability. Thus, addressing metadata page misses in RDF environments is essential for ensuring robust data protection and swift recovery capabilities.

Embodiments of the present disclosure address the challenges associated with metadata page misses in data storage arrays, particularly in environments utilizing Remote Data Facilities (RDF) for data replication and synchronization. For instance, the embodiments can use an innovative technique called Metadata Hinting (MDH), which leverages service level and extent level statistics shared across the RDF network to optimize metadata management.

In addition, the embodiments can determine a metadata demand score for each extent of a storage array. This score is based on hit and read forecasts corresponding to input/output (IO) operations targeting each extent. By ranking each extent based on their respective metadata demand scores, the embodiments can prioritize the paging of metadata into memory from a storage device, effectively reducing metadata page misses.

The embodiments can also adjust the metadata demand score for each extent based on the service level associated with each extent. For example, higher service levels can receive a higher adjustment factor, ensuring that critical data has faster access to metadata. Further, the embodiments can generate an activity mask for each extent based on monitored IO access patterns. This mask helps dynamically update the metadata demand score, allowing the embodiments to adapt efficiently to changing data access patterns.

To manage memory effectively, the embodiments can provide extents having metadata hints with artificial timestamps. These timestamps prioritize their retention in memory, ensuring that metadata for frequently accessed extents is readily available. Additionally, the embodiments can control the metadata hinting rate based on each extent's metadata demand score to prevent excessive churn in the memory, thereby maintaining system stability and performance.

By implementing these strategies, the embodiments significantly enhance the efficiency of metadata management in RDF environments, leading to improved performance, reduced latency, and more robust data protection mechanisms.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
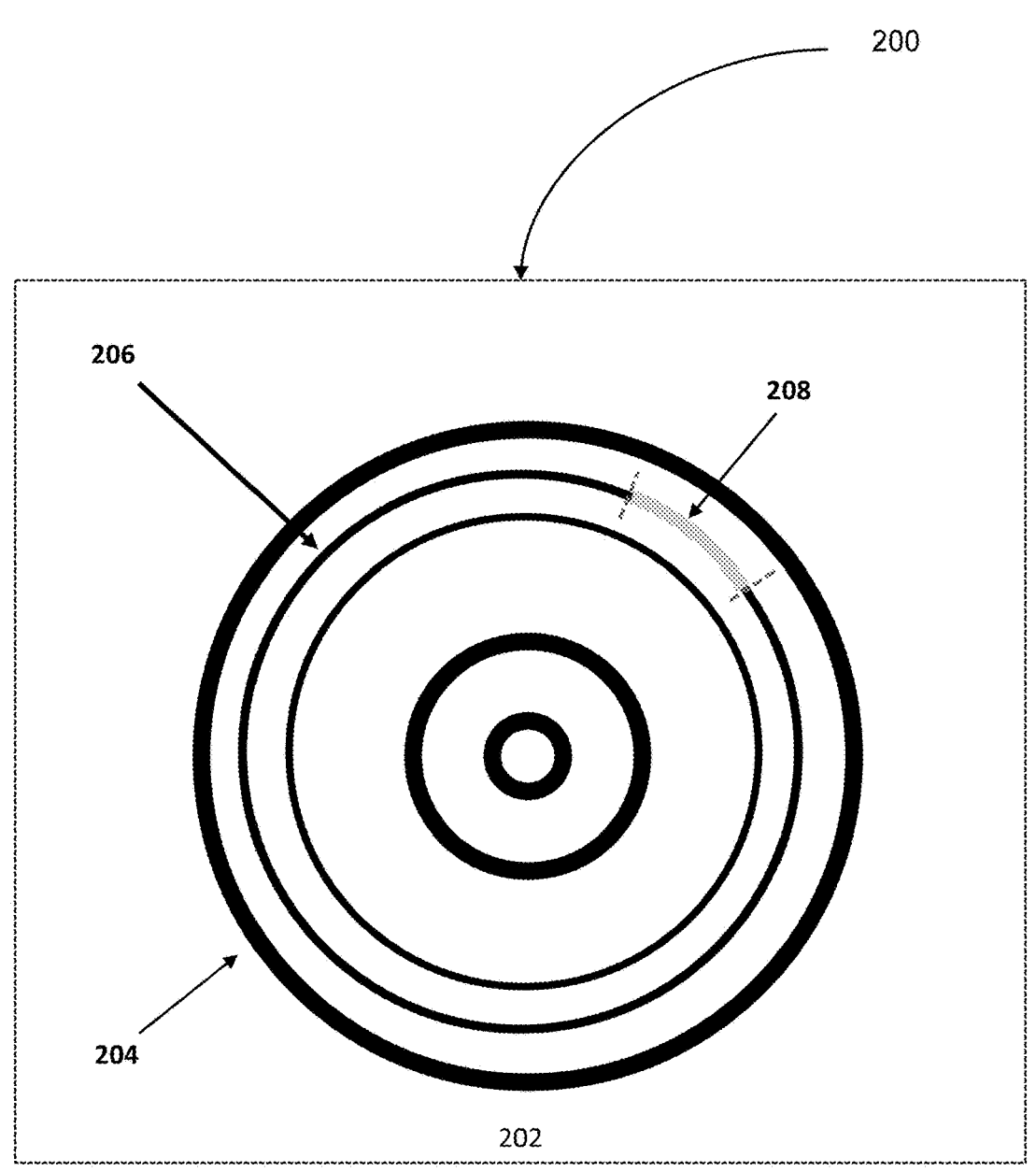
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*. For example, the EDS 140 can provide a host, e.g., client machine 126*a*, with a virtual storage device (e.g., thin-device (TDEV)) that logically represents zero or more portions of each storage device 132*a-n*. For example, the EDS 140 can establish a logical track using zero or more physical address spaces from each storage device 132*a-n*. Specifically, the EDS 140 can establish a continuous set of logical block addresses (LBAs) using physical address spaces from the storage devices 132*a-n*. Thus, each LBA represents a corresponding physical address space from one of the storage devices 132*a-n*. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 140 can enable the HA 122 to present the hosts 106 with logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Diamond, Platinum, and Gold service levels (SLs)). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
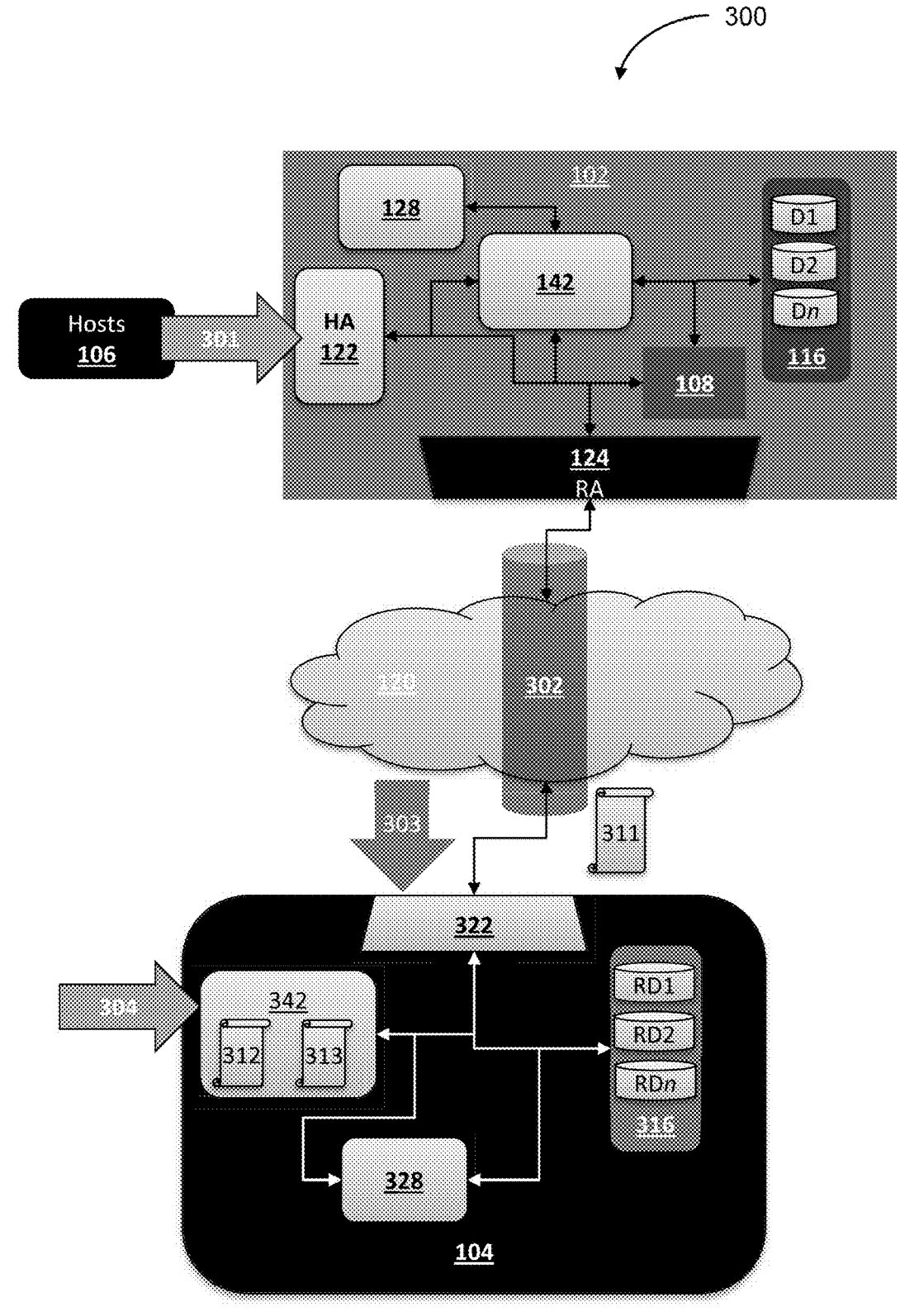
FIG. 3 is a block diagram of a communications network, including a storage array and a remote data facility (RDF) in accordance with embodiments of the present disclosure.

Regarding FIG. 3, a distributed network environment 300 can be substantially similar to the distributed network environment 100 of FIG. 1. For instance, the distributed network environment 300 can include a storage array 102, remote system 104, and hosts 106. In embodiments, the storage array 102 can receive an input/output (IO) workload 301 from the hosts 106. The storage array 102 can include a host adapter (HA) 122 that processes the IO workload 301. The HA 122 can classify the IO workload 301 and its IO operations. The classification can include identifying the type of IO operation (e.g., read, write, replication), 10 size, and associating each operation with a specific service level (e.g., Diamond, Platinum, Gold, Silver, and Bronze).

In embodiments, a service level agreement (SLA) can define the level of service expected from a storage array (e.g., the storage array 102) or a remote system (e.g., the remote data facility (RDF) 104). Specifically, the SLA can define performance metrics for processing IO workloads (e.g., the IO workload 301) and their respective 10 operations. The performance metrics can include throughput (e.g., data transfer rate in megabytes per second (MB/s) or gigabytes per second (GB/s)), Input/Output Operations Per Second (IOPS) (e.g., the minimum read and write operations the storage array should be able to handle per second), and latency (e.g., the maximum acceptable delay for an IO operation to be completed).

Further, the SLA can categorize IO operations into distinct priority levels (e.g., Diamond, Platinum, Gold, Silver, and Bronze SLs). Additionally, critical operations that affect core business functions might be classified at a higher priority level, requiring faster throughput and lower latency. Accordingly, the SLA can specify different performance metrics for each priority level, ensuring that critical operations are given priority over less critical tasks.

In embodiments, IO operations critical to business operations, such as financial transactions, real-time data analytics, or emergency response systems, can have a high priority level (e.g., Diamond or Platinum). The storage array 102 can give these high-priority level IO operations preferential access to resources (e.g., faster CPUs, more cache memory, and quicker storage media). Essential but not critical 10 operations, such as batch processing jobs, standard database queries, or internal data transfers, can have a medium priority level (e.g., Gold or Silver). The storage array 1 02 can provide these medium-priority IO operations with adequate resources to ensure good performance without preempting resources from higher-priority tasks. Non-critical IO operations that can tolerate delays, such as backup operations, data archiving, or other maintenance-related tasks, can have a low priority level (e.g., Bronze). The storage array 102 can allocate resources not used by higher-priority tasks to these low-priority IO operations. Further, the storage array 102 can pause or slow down resource allocations for these low-priority IO operations during high system load to preserve performance for higher-priority IO operations.

In embodiments, the storage array 102 can include a controller 142 that can manage the array's memory resources (e.g., the global memory (GM) 128). For example, the controller 142 can divide the GM 128 into several segments, where a specific portion is reserved exclusively for metadata. At the same time, the controller 142 can allocate most of the GM 142 for caching user data (e.g., data corresponding to IO operations received from the hosts 106). This segmentation ensures that metadata-related operations do not interfere excessively with the primary data operations. Further, the controller 142 can allocate a storage device (e.g., D1) or one or more portions of the persistent storage 116 for permanent storage of the metadata.

In embodiments, the HA 122 can parse information from each IO operation in the IO workload 301. For example, each IO operation can include information such as the target device (TDEV), which specifies the virtual volume on which the data corresponding to each IO operation resides, the LBA (Logical Block Address), which indicates the starting block address where the data needs to be read from or written to, and Logical Block Count (LBC), which specifies the count of logical blocks that the I/O operation is intended to access starting from the specified LBA.

Using the LBA and LBC, the controller 142 maps these logical addresses to physical storage locations. This mapping can involve consulting a mapping table that translates logical block addresses into physical block addresses or locations on the storage media (e.g., the persistent storage 116). Once the controller 142 has mapped the LBA to a specific physical location, it identifies the corresponding TIDs. These TIDs represent specific tracks on the disks where the data blocks are physically stored or need to be written. The TID helps locate the data and plays a crucial role in optimizing disk operations by allowing the controller to manage and access tracks efficiently.

In embodiments, the controller 142 uses metadata associated with each TID to manage data more effectively. This metadata can include data protection levels, compression settings, and deduplication information. It also includes the status of the data, such as whether it is clean or dirty (modified but not yet written to disk). Based on the TIDs and the associated metadata, the controller 142 can decide to cache certain data blocks in the array's GM 128 to speed up future accesses. This decision is influenced by factors such as the frequency of access (hot data) and the 10 patterns observed. With the TIDs identified and any necessary data cached, the controller 142 executes the 10 operation. For read operations, it retrieves the data from the specified tracks and sends it back to the host. For write operations, it writes the data to the designated tracks and updates the metadata accordingly.

In embodiments, the controller 142 can monitor the activity levels of Logical Block Addresses (LBAs) of extents in each Target/Thin Device (TDEV) of the storage array 102 through real-time tracking and predictive analytics. In particular, the controller 142 can continuously track access patterns at the level of individual LBAs within each extent of a TDEV. This involves recording each read and write operation that targets specific LBAs. The frequency and recency of these accesses are vital metrics that help determine each LBA's "hotness" or activity level.

The controller 142 can also monitor extents (i.e., groups of contiguous LBAs) to assess their overall activity. For example, controller 142 can maintain extent maps (e.g., the extent maps 502a-n of FIG. 5) that log the access history and patterns associated with these extents. For each TDEV, the controller 142 can generate an activity map 311, including all their extent maps. For more granular control and analysis, the controller 142 can use activity masks. For instance, an activity mask is a data structure that marks the activity status of each LBA within an extent. It indicates which parts of the extent have been accessed recently, visually representing data usage patterns. Further, the controller 142 can update and store metadata for each extent, including its activity mask, in, e.g., storage device D1. The metadata can include access patterns and additional information like last access timestamps, frequency of access, and predictive access patterns based on historical data.

In embodiments, controller 142 can assign a metadata demand score to each extent based on its observed activity levels. For example, the controller 142 can generate the score using factors such as the number of accesses, the type of accesses (read or write), and predictive analytics that forecast future access patterns based on historical data. Based on the metadata demand scores, the controller 142 makes dynamic decisions about which metadata to cache. The controller 142 can prioritize caching for metadata associated with extents that have high activity levels. This ensures that metadata for frequently accessed data is readily available in the cache, reducing latency and improving performance.

In embodiments, the storage array (e.g., "local" or "source" array) 102 can be paired with a secondary storage array (e.g., "remote," "target," or "RDF" array) 104 located at a different geographical site. For instance, the storage array 102 can establish an RDF link 302 with the RDF array 104 over a network (e.g., the remote network 120). Accordingly, the storage array 102 can use the RDF array 104 as a data replication and disaster recovery solution, ensuring data availability and integrity across geographically dispersed locations. Accordingly, the RDF 104 can receive replication workloads 303, which include data and operations mirrored from the primary storage array 102 to the RDF 104.

The storage array 102 can also designate specific logical volumes or devices, representing one or more portions of storage devices D2-n of the storage array's persistent storage 116 for replication. In particular, the storage array 102 can logically group the designated volumes/devices for replication. For example, the storage array 102 can configure each group with specific replication properties, such as synchronous or asynchronous replication, depending on the required data protection level and performance impact.

In synchronous replication, every write IO operation from a host (e.g., one of the hosts 106) to the primary storage array (e.g., the storage array 102) is simultaneously replicated to the secondary storage array (e.g., the RDF 104). Further, the primary storage array waits for an acknowledgment from the secondary array before confirming the write IO operation to the host. Accordingly, synchronous replication guarantees that both arrays are always in sync and ensures zero data loss.

Asynchronous replication involves replicating data to the secondary array with a slight delay. The primary array does not wait for an acknowledgment for each write operation, which minimizes the impact on performance. This method is suitable for situations where some data loss is tolerable in exchange for higher throughput and lower latency.

In embodiments, the RDF 104 can receive local workloads 304 and replication workloads 303. The local workload 302 can include the operations and processes initiated and managed directly within the RDF. For example, the RDF 104 can perform backup operations such as local backups of data stored in the persistent storage 316 of the RDF 104, which may not necessarily be replicated back to the primary storage array 102. The local backups can be crucial for disaster recovery and data integrity within the RDF 104. Likewise, the RDF 104 can perform maintenance tasks like defragmentation, integrity checks, and other routine maintenance operations that ensure the health and efficiency of the RDF 104. In addition, the RDF 104 can perform data analytics or processing tasks on replicated data corresponding to the replicated IO workloads 303 received from the primary storage array 102. Thus, businesses can use the RDF 104 for more than a failover site, turning it into an active processing node. Further, the RDF 104 can run applications that use the replicated data for various operation needs. These applications, such as local monitoring tools, can be specific to the RDF 104.

Additionally, the local workloads 304 and the replication workloads 303 can have different performance impacts on the RDF 104. Specifically, the RDF 104 can manage the local workload 302 without the immediate pressure of impacting its performance. In contrast, the RDF 104 must handle the replication workloads 303 in a way that minimizes impact on its operations.

Asynchronous replication jobs corresponding to the replication workloads 303 present unique challenges for forecasting due to their inherent characteristics and operational dynamics. Unlike synchronous replication, where data is replicated to the RDF 104 in real-time, and each operation waits for an acknowledgment, asynchronous replication allows for a delay between data being written at the storage array 102 and replicated to the RDF 104. This delay introduces complexities in predicting workload behaviors and system requirements.

For instance, the delay can result in variable latency, where the time lag can fluctuate based on network conditions, the volume of data being transferred, and system load. Accurately predicting these delays is challenging due to their dependence on fluctuating external factors. Additionally, asynchronous replication requires the RDF 104 to process data in bursts. For example, data might accumulate during peak operational hours and then get replicated during off-peak hours. This bursty nature leads to significant network and system load variations, making it difficult for the RDF 104 to predict when and how many resources will be needed.

In embodiments, the RDF 104 can regularly receive activity maps 311 corresponding to TDEVs of the primary storage array 102 designated for remote replication. The TDEV activity maps 311 can include details such as the physical location of the extent, access frequency, last access time, and any security or redundancy settings. The TDEV activity maps 311 can also include predictive analytics, providing insights into expected workload patterns and resource needs to process the replication workloads 303 at any given time. Thus, the RDF 104, via an RDF controller 342, can analyze the TDEV activity maps 311 to determine how resources are allocated and managed at the primary storage array 102. The analysis can include identifying patterns in resource usage during peak and off-peak times and during different types of operations (e.g., heavy read or write periods).

In embodiments, the RDF controller 342 can monitor local workloads 304. Based on the local workloads, the RDF controller 342 can generate extent maps (e.g., the extent maps 502*a-n* of FIG. 5) that log the access history and patterns associated with the extents of each of the RDF's corresponding TDEVs (RDF TDEVs). Further, the RDF controller 342 can assign a metadata demand score for the extents of each RDF TDEV based on activity levels corresponding to the local workloads 304. The RDF controller 342 can generate RDF TDEV activity maps 312 for the RDF's corresponding TDEVs. Thus, the RDF controller 342 can use the local RDF TDEV activity maps 312 as a baseline for caching metadata corresponding to the local workloads 304.

In embodiments, the RDF controller 342 can integrate the data corresponding to the TDEV activity maps 311 of the primary storage array 102 with the local RDF TDEV activity maps 312 by aligning their respective resource allocation strategies and performance benchmarks to ensure consistency across both sites (e.g., the primary storage array 102 and the RDF 104). The data integration process considers factors such as mirroring the primary storage array's resource distribution to handle replication workloads and maintain data consistency effectively.

In embodiments, the RDF controller 342 can generate a composite TDEV activity map 313 using the TDEV activity maps 311 corresponding to the storage array 102 and the local RDF TDEV activity maps 312. For example, the RDF controller 342 can merge the RDF's local resource management strategies with the predictive insights and operational patterns derived from the primary array's TDEV activity maps 311. Accordingly, the composite TDEV activity map 313 can provide a unified view of how resources should be allocated and managed to optimize performance, reduce costs, and ensure SLA compliance.

Figure 4:
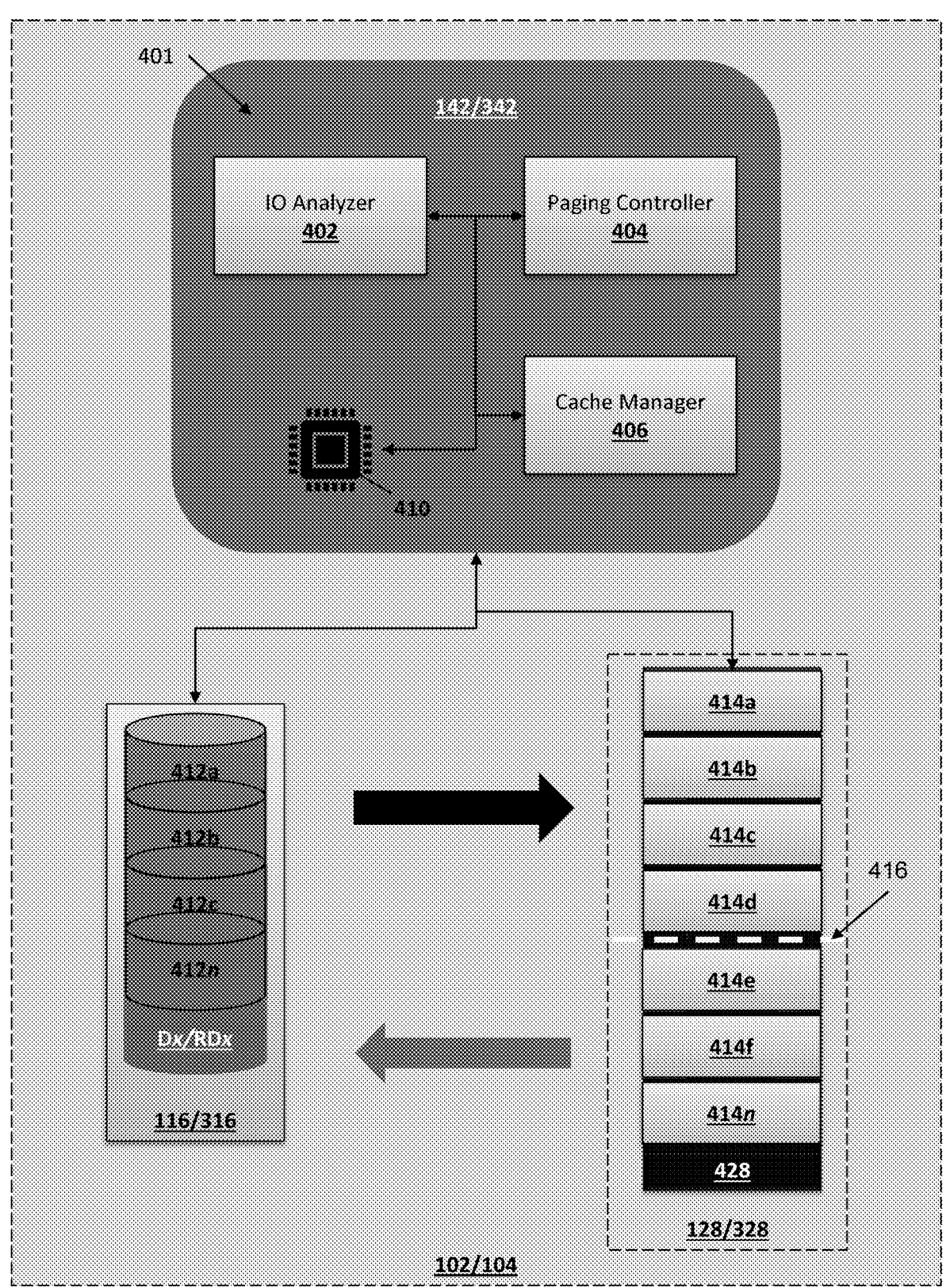
FIG. 4 is a block diagram of a controller in accordance with embodiments of the present disclosure.

Regarding FIG. 4, a controller 142/342 of a storage system 102/104 can include logic, hardware, and circuitry 401 configured to optimize metadata management in a storage system 102/104 by reducing metadata page misses using Metadata Hinting (MDH) techniques.

In embodiments, the controller 142/342 can include an IO analyzer 402 that assesses each extent corresponding to TDEVs Dx/Rx of the storage system 102/104. For example, the IO analyzer 402 can calculate a metadata demand score based on predictive analytics, utilizing hit forecasts and read forecasts derived from 10 operations. Using the metadata demand score, the IO analyzer 402 can identify which data extents will likely be accessed frequently, facilitating proactive metadata management.

For example, the IO analyzer 402 can collect data on all IO operations directed at the storage system 102/104. The data can include details about each operation, such as the type (read or write), the target extent, the data size, and the operation's timestamp. The IO analyzer 402 can also store the collected data in a local memory 410. Additionally, the IO analyzer 402 can aggregate data from individual 10 operations to form a comprehensive view of access patterns across different extents. Further, the IO analyzer 402 can perform the aggregation over various time windows to capture short-term fluctuations and long-term trends in data access.

In embodiments, the IO analyzer 402 can perform one or more time series analysis techniques to examine the sequence of read and write requests corresponding to IO operations of an IO workload. Based on the examination, the 10 analyzer 402 can identify patterns, trends, and cyclic behavior in the access data, which indicates future access probabilities. For example, the IO analyzer 402 can perform ARIMA (AutoRegressive Integrated Moving Average) and EMA (Exponential Moving Average) techniques to forecast future access patterns based on historical data. Based on the forecasts, the IO analyzer 402 can estimate the likelihood and frequency of future accesses for each extent.

Figure 5:
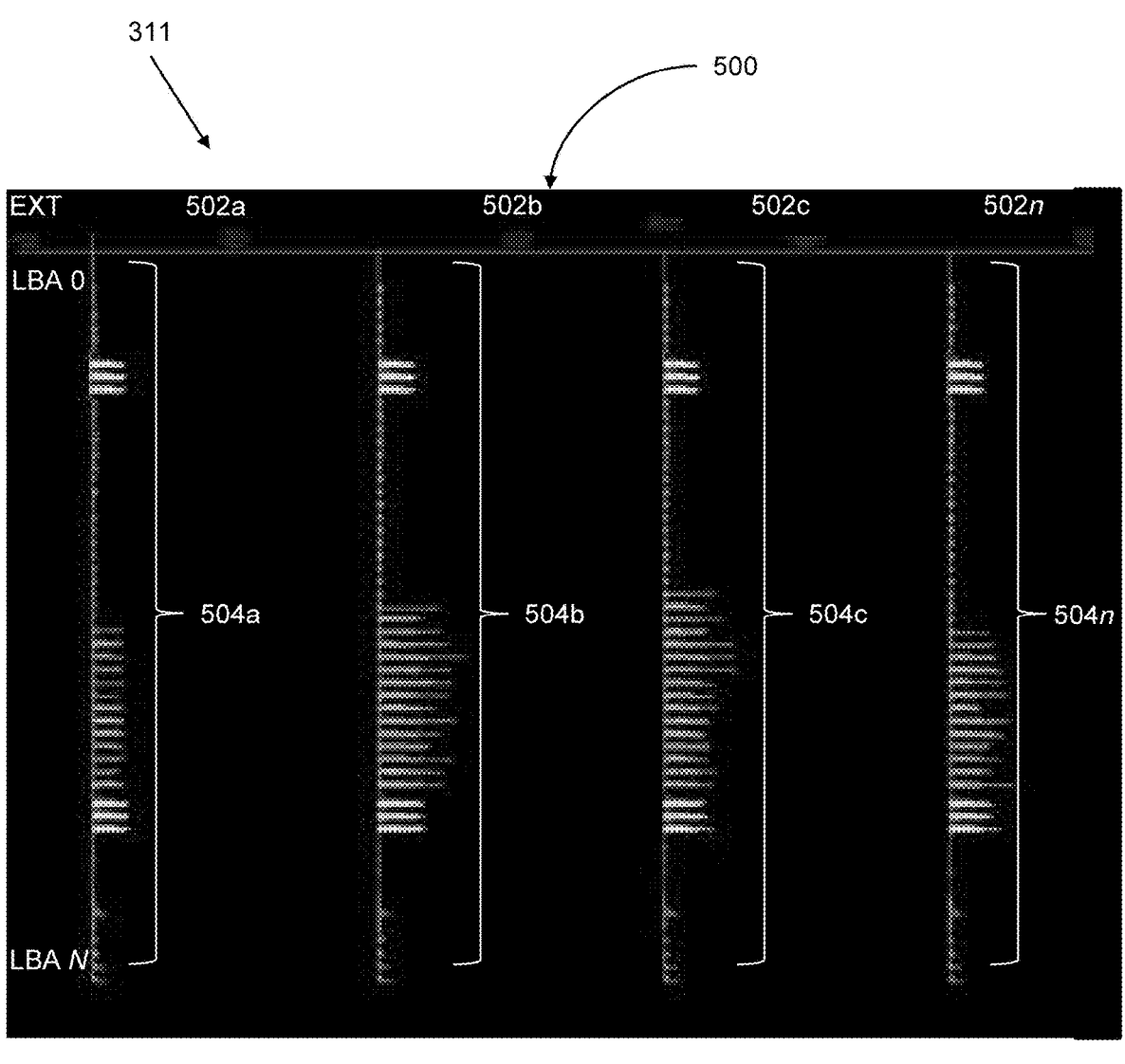
FIG. 5 is a block diagram of input/output (IO) activity of a thin device (TDEV) in accordance with embodiments of the present disclosure.

Regarding FIG. 5, the IO analyzer 402 of FIG. 4 can generate an activity map for each TDEV of a storage system (e.g., TDEV Dx/Rx and storage system 102/104 of FIG. 4). For example, the IO analyzer 402 can generate an activity map (e.g., extent map) 311 for a TDEV 500. The activity map 311 provides a visual or data-driven representation of the access patterns across different extents 502*a-n* of the TDEV 500. Using the activity map 311, the IO analyzer 402 can identify which areas of the data landscape are most active, guiding strategic decisions about data caching and retrieval. For example, the IO analyzer 402 can aggregate access data over a specified period to generate the activity map 311.

In embodiments, the IO analyzer 402 can generate activity masks 504*a-n* that show access patterns of their corresponding extents 502*a-n* of the TDEV 500. The activity masks 504*a-n* are detailed data structures that track access patterns at a granular level within each extent. It records which parts of an extent are accessed and how frequently, providing a detailed view of its usage. For instance, the IO analyzer 402 can monitor the activity levels of LBAs 0-N for each extent 502*a-n* by recording each read and write operation that targets the specific LBAs 0-N.

Figure 6:
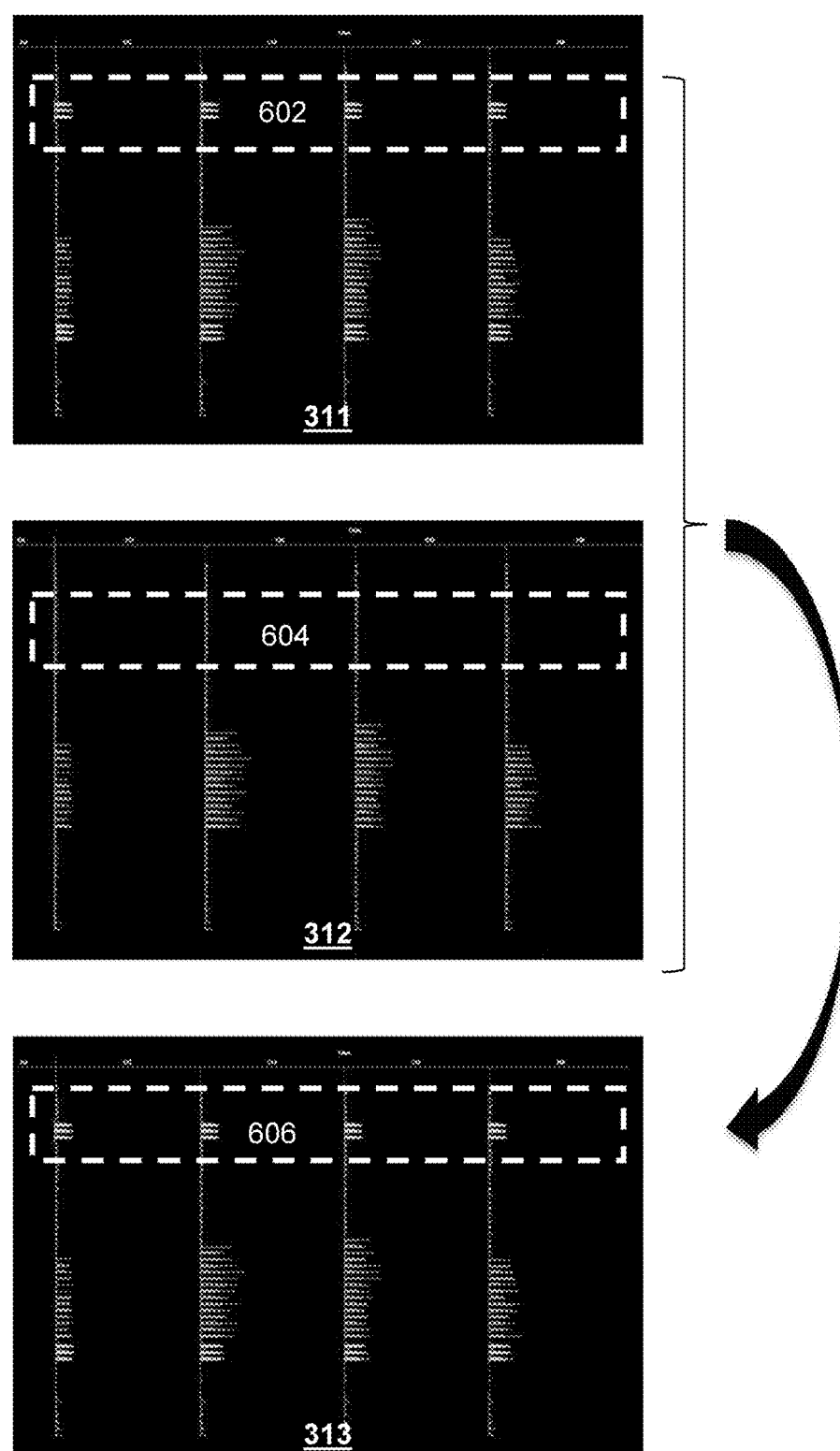
FIG. 6 is a block diagram of IO activity of a composite TDEV in accordance with embodiments of the present disclosure.

Regarding FIG. 6, the controller 1428/342 can reside in an RDF (e.g., the RDF 104 of FIG. 3). In such circumstances, the IO analyzer 402 can regularly receive activity maps (e.g., the activity map 311) corresponding to TDEVs of the primary storage array 102 designated for remote replication. Additionally, the IO analyzer 402 can monitor local workloads (e.g., the local workloads 304 of FIG. 3) to generate local activity maps (e.g., the local activity map 312) that log the access history and patterns associated with the extents of each of the RDF's corresponding TDEVs (RDF TDEVs).

In embodiments, the IO analyzer 402 can generate a composite TDEV activity map 313 using the TDEV activity maps 311 corresponding to the storage array 102 and the local RDF TDEV activity maps 312. For example, the activity map 311 shows certain activity levels for a block of LBAs 602 across the extents of a TDEV. In contrast, the activity map 311 shows a lack of activity levels for a corresponding block of LBAs 604. Accordingly, the composite TDEV activity map 313 blends the activity levels from the activity map 311 and the local RDF activity map 312 to show the activity levels for a corresponding block of LBAs 606 in the composite TDEV activity map 313.

Referring back to FIG. 4, the IO analyzer 402 can use the activity maps (e.g., the activity maps 311, 312, and 313 of FIGS. 3 and 5-6) to establish a cache hit metric. The cache hit metric tracks and quantifies the demand for metadata associated with each extent 412*a-n* of each TDEV Dx/Rx in the storage system 102/104. In particular, it measures the frequency and recency of cache hits for each extent, providing a numerical value that reflects the likelihood of future accesses. Additionally, the IO analyzer 402 can use the cache hit metric to score extents by incorporating factors such as the frequency of hits and the time elapsed since each hit. More recent and frequent hits can result in higher scores, indicating a higher likelihood of future access.

In embodiments, the IO analyzer 402 can establish a metadata load score to evaluate and manage the load of metadata associated with each extent using the activity maps. The metadata load score helps determine how intensively the metadata for each extent is being utilized, which influences decisions related to metadata caching, paging, and eviction. For example, the IO analyzer 402 can measure how frequently the metadata of an extent is accessed. Higher access frequencies indicate that the metadata is in high demand, which increases the metadata load score. In addition, the IO analyzer 402 can determine the nature of the IO operations (read or write) performed to the extent that also affects the load score. Write operations might be weighted more heavily than read operations because they often require immediate updates to the metadata.

In embodiments, the IO analyzer 402 can calculate the metadata load score using a function that integrates a comprehensive range of factors. These factors, including access frequency, operation weight, temporal metrics, and the like, cover all aspects of metadata usage. The access frequency corresponds to a count or rate of how often the metadata is accessed; the operation weight reflects the impact of different types of operations on the metadata, and the temporal metric accounts for access patterns over time, potentially giving more weight to accesses during peak periods.

The IO analyzer 402 can also generate a metadata hinting score (MDHScore) based on the metadata load score corresponding to each extent of each TDEV. This score is not just a metric but a powerful tool that optimizes metadata management by predicting and prioritizing extents requiring proactive memory paging. It does so by using a combination of various factors that reflect the likelihood of future metadata access based on past and current usage patterns, thereby providing a proactive approach to metadata management.

The MDHScore can be based on hit and read forecasts, extent activity analysis, and service levels. Based on historical access data, a hit forecast predicts the likelihood of cache hits for each extent. The IO analyzer 402 can use time series or machine learning (ML) techniques to generate the hit forecasts. Like the hit forecast, the read forecast estimates the future read operations targeting each extent. This forecast helps the IO analyzer 402 determine the data's read-intensive nature. Additionally, the IO analyzer 402 can perform the extent activity analysis using the activity mask, which tracks access at a granular level (e.g., LBAs or TIDs). This analysis helps in identifying which segments (e.g., LBAs or TIDs) of an extent are frequently accessed. Further, the IO analyzer 402 can adjust the MDHScore based on an extent's specific service level, dictating the extent's corresponding priority level. For example, extents linked to higher service levels (e.g., Gold or Platinum) might receive a higher base score or a multiplier in the MDHScore calculation, reflecting their criticality.

In embodiments, the controller 142/342 can include a paging controller 404 that manages the efficient storage and retrieval of metadata based on calculated priority scores, such as the MDHScore or Metadata Load Score. Thus, the paging controller 404 helps optimize the performance of the storage system 102/104 by ensuring that metadata is available in memory when needed, thereby reducing access times and improving overall system responsiveness.

For example, the paging controller 404 can rank extents 412*a-n* corresponding to one or more TDEVs Dx/Rx corresponding to persistent storage 116/316 of the storage system 102/104. The paging controller 404 can rank the extents 412*a-n* based on their respective metadata demand scores. Accordingly, the paging controller 404 can determine that extents with higher scores are more likely to be accessed soon and are thus prioritized for quicker paging. Further, the paging controller 404 can integrate data from various sources (e.g., the IO analyzer 402) to maintain an updated ranking of all extents based on their likelihood of access.

Based on the rankings, the paging controller 404 can manage the paging from slower storage media (like HDDs or SSDs) (e.g., the persistent storage 116/316) into faster memory systems (such as DRAM or other types of volatile memory like GM 128/328). Additionally, the paging controller 404 can oversee the allocation and eviction of metadata in cache slots 414*a-n* corresponding to a metadata memory portion 428 of the GM 128/328. Further, the paging controller 404 can determine which metadata to page into the metadata memory portion 428 and which to evict based on their rankings and current memory status. For example, the paging controller 404 can consider factors such as the metadata size, the frequency of access, and the criticality of the data.

In embodiments, the controller 142/342 can also include a cache manager 406 that optimizes the efficiency and effectiveness of cache memory usage (e.g., the metadata memory portion 428). To that end, the cache manager manages metadata caching, ensuring that frequently accessed data is readily available, reducing access times and improving overall system performance. The cache manager 402 can manage the Least Recently Used (LRU) and Most Recently Used (MRU) cache slots 414*a-n* in the metadata memory portion 428. In particular, the cache manager 406 can optimize the retention and eviction of metadata in the metadata memory portion 428 based on usage patterns of corresponding extents 412*a-n* of the TDEVs Dx/Rx.

In embodiments, the cache manager 406 allocates cache slots 414*a-n* within the metadata memory portion 428 of the GM 128/328. Specifically, the cache manager 406 can determine which metadata should be stored in the cache based on access patterns and priority scores, such as the MDHScore, corresponding to the extents 412*a-n* of the TDEVs Dx/Rx. Based on the metadata demand scores and access frequencies, the cache manager 406 dynamically allocates cache slots 414*a-n* to metadata predicted to be accessed frequently. Additionally, the cache manager 406 can use sophisticated eviction algorithms to manage the cache space efficiently. These algorithms determine which metadata to evict from the cache when new metadata needs to be loaded, typically evicting the least recently used data first.

For example, the cache manager 406 can use a caching policy that blends Least Recently Used (LRU) and Most Recently Used (MRU) techniques to decide which metadata to retain in the cache and which to evict when space is needed. Accordingly, the cache manager 406 monitors cache usage and performance, analyzing patterns to optimize caching strategies. This monitoring helps identify potential improvements and adjustments to caching policies. For example, the cache manager 406 dynamically adjusts the placement of metadata in memory, promoting frequently accessed metadata to more stable memory positions and demoting or evicting less frequently accessed metadata to make room for more critical data.

In embodiments, the cache manager 406 can establish a Fall-Through Time (FTT) threshold 416 that defines a threshold time for how long metadata can remain in the metadata memory portion 428 before it is considered for eviction. Accordingly, the cache manager 406 can use the FTT 416 as a benchmark for how long metadata should ideally remain in the cache without being accessed before it becomes a candidate for eviction. Metadata that hasn't been accessed for a duration exceeding the FTT 416 will likely be replaced by more recently accessed or higher-priority metadata. By adjusting the FTT 416, the cache manager 406 can balance the need for cache freshness (access to the most recent and relevant data) with the efficiency of cache usage (optimal utilization of cache space).

Further, the cache manager 406 can evict metadata from the metadata memory portion 428 using an LRU policy. Accordingly, the cache manager 406 can use the FTT 416 to define an age threshold beyond which metadata is moved to the bottom of the cache stack, making it the first to be evicted when new space is required. Additionally, the cache manager 406 can adaptively adjust the FTT 416 based on system performance and workload requirements. For instance, during peak load times, a shorter FTT might be implemented to ensure that only the most relevant metadata is kept in the cache slots 414a-n.

In embodiments, the cache manager 406 can manage the retention and prioritization of metadata in the metadata memory portion 128 using artificial timestamps based on the FTT 416. For example, the cache manager 406 can correspond to a controller 142/342 residing in an RDF (e.g., the RDF 104 of FIG. 3). Accordingly, the RDF can receive replication workloads 303 and local workloads 304. Further, the replication workloads 303 can correspond to asynchronous replication data, and it is difficult for the IO analyzer 402 to forecast the activity of corresponding extents and linked metadata. Thus, the extents and metadata corresponding to the replication workloads 303 may not include timestamps that accurately identify their predicted access rates.

In embodiments, the cache manager 406 can provide artificial timestamps for extents 412a-n that are predicted to be accessed in the future but have not yet been accessed frequently enough to naturally stay within the metadata memory portion 428 due to standard caching algorithms like Least Recently Used (LRU) or Most Frequently Used (MFU). Accordingly, when metadata corresponding to an extent 412a-n is paged into the metadata memory portion 428, it can be inserted with an artificial timestamp by the cache manager 406. Thus, the artificial timestamp is not a reflection of actual access times. Instead, it is a strategic value assigned to make the system treat this metadata as if it were accessed more recently than it was.

Further, the cache manager 406 can use artificial timestamps to help manage memory churn, which frequently replaces data in the memory 428. By assigning these timestamps to selected metadata, the cache manager 406 can maintain a stable data set in the memory 428, reducing the overhead and latency associated with frequent data swapping. Additionally, the artificial timestamps can bias the cache manager 406 towards retaining metadata that is deemed critical based on predictive analytics. This is particularly useful in systems where future data access patterns can be forecasted reasonably accurately, allowing the system to load and retain useful metadata preemptively. For example, the metadata demand score, calculated based on factors like hit forecasts and read forecasts, determines which extents' metadata is critical. The extents with high metadata demand scores are given artificial timestamps to ensure their metadata remains in the global memory, thus reducing access times and improving system performance.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 7, a method 700 relates to paging metadata into memory. In embodiments, the controller 142/342 of FIGS. 3-4 can perform all or a subset of operations corresponding to the method 700.

For example, the method 700, at 702, can include calculating a metadata demand score for each extent of a storage array based on hit forecasts and read forecasts corresponding to input/output (IO) operations targeting each extent. Additionally, at 704, the method 700 can include ranking each extent based on their respective metadata demand scores. Further, the method 700, at 706, can include paging metadata into memory from a storage device of the storage array based on the ranking to reduce metadata page misses. In embodiments, the memory can correspond to a global memory portion of the storage array.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
calculating a metadata demand score for each extent of a storage array based on hit forecasts and read forecasts corresponding to input/output (IO) operations targeting each extent;
ranking each extent based on their respective metadata demand scores;
receiving extent level statistics from another storage array;
generating an effective metadata demand score for each extent of the storage array using the extent level statistics from the other storage and the metadata demand score for each extent of the storage array; and
paging metadata into memory from a storage device of the storage array based on the ranking to reduce metadata page misses, wherein the memory corresponds to a global memory portion of the storage array.

2. The method of claim 1, further comprising:
adjusting the metadata demand score for each extent based on a service level associated with each extent, with higher service levels resulting in a higher adjustment factor.

3. The method of claim 1, further comprising:
identifying Least Recently Used (LRU) cache slots corresponding to paged extent metadata in the memory;
identifying Most Recently Used (MRU) cache slots corresponding to the paged extent metadata in the memory; and
paging the metadata into the memory from the storage device based on the LRU cache slots and the MRU cache slots.

4. The method of claim 1, further comprising:
excluding each extent with a service level below a service level threshold from receiving the metadata demand score.

5. The method of claim 1, further comprising:

monitoring IO access patterns of each extent;

generating an activity mask for each extent based on the monitored IO access patterns; and dynamically updating the metadata demand score for each extent using the activity mask for each extent.

6. The method of claim 5, further comprising:

establishing a metadata hint for a subject extent based on the metadata demand score of the subject extent and a service level of the extent.

7. The method of claim 6, further comprising:

inserting each extent with the metadata hint into the memory.

8. The method of claim 7, further comprising:

providing each extent with the metadata hint with an artificial timestamp to prioritize its retention in the memory based on predicted future access of each extent.

9. The method of claim 8, further comprising:

controlling a rate of metadata hinting for each extent based on the metadata demand score of each extent to avoid excessive churn in the memory.

10. An apparatus with a memory and processor, the apparatus configured to:

calculate a metadata demand score for each extent of a storage array based on hit forecasts and read forecasts corresponding to input/output (IO) operations targeting each extent;

rank each extent based on their respective metadata demand scores;

receive extent level statistics from another storage array;

generate an effective metadata demand score for each extent of the storage array using the extent level statistics from the other storage and the metadata demand score for each extent of the storage array; and page metadata into memory from a storage device of the storage array based on the ranking to reduce metadata page misses, wherein the memory corresponds to a global memory portion of the storage array.

11. The apparatus of claim 10, further configured to:

adjust the metadata demand score for each extent based on a service level associated with each extent, with higher service levels resulting in a higher adjustment factor.

12. The apparatus of claim 10, further configured to:

identify Least Recently Used (LRU) cache slots corresponding to paged extent metadata in the memory;

identify Most Recently Used (MRU) cache slots corresponding to the paged extent metadata in the memory; and page the metadata into the memory from the storage device based on the LRU cache slots and the MRU cache slots.

13. The apparatus of claim 10, further configured to:

exclude each extent with a service level below a service level threshold from receiving the metadata demand score.

14. The apparatus of claim 10, further configured to:

monitor IO access patterns of each extent;

generate an activity mask for each extent based on the monitored IO access patterns; and dynamically update the metadata demand score for each extent using the activity mask for each extent.

15. The apparatus of claim 14, further configured to:

establish a metadata hint for a subject extent based on the metadata demand score of the subject extent and a service level of the extent.

16. The apparatus of claim 15, further configured to:

insert each extent with the metadata hint into the memory.

17. The apparatus of claim 16, further configured to:

provide each extent with the metadata hint with an artificial timestamp to prioritize its retention in the memory based on predicted future access of each extent.

18. The apparatus of claim 17, further configured to:

control a rate of metadata hinting for each extent based on the metadata demand score of each extent to avoid excessive churn in the memory.

* * * * *